United States Patent [19]

LaPointe

[11] Patent Number: 4,693,495
[45] Date of Patent: Sep. 15, 1987

[54] SHOULDER BELT CUSHION

[76] Inventor: Virginia L. LaPointe, 21825 Superior, Taylor, Mich. 48180

[21] Appl. No.: 817,979

[22] Filed: Jan. 13, 1986

[51] Int. Cl.$^4$ ............................................. B60R 22/00
[52] U.S. Cl. ....................................... 280/808; 297/482
[58] Field of Search ...................... 280/801, 806, 808; 297/482, 483

[56] References Cited

FOREIGN PATENT DOCUMENTS 1581996 12/1980 United Kingdom ................ 297/482
2048651 12/1980 United Kingdom ................ 280/801

Primary Examiner—David M. Mitchell
Assistant Examiner—Karin L. Ferriter
Attorney, Agent, or Firm—Irvin L. Groh; Alfred L. Patmore, Jr.

[57] ABSTRACT

A cushion is mounted on a vehicle shoulder belt for softening the pressure of the belt on the user, and includes a foam pad encased in a fabric cover with hook and loop fastener means along opposite side edges of the cover so that it may be removed from the shoulder belt. Stitching connects opposite ends of the over along a central fold line to assist the user in folding the cushion over the shoulder belt while permitting the midsection of the cushion to comfortably contact the user.

3 Claims, 4 Drawing Figures

SHOULDER BELT CUSHION

BACKGROUND OF THE INVENTION

This invention is related to cushions or pads mounted on vehicle shoulder belts to cushion the pressure of a taut shoulder belt on a user, and more particularly to such a cushion which can be easily folded over and connected to the shoulder belt, and has the stitching for the cover located so the user can comfortably contact the cushion.

A problem with using vehicle shoulder belts is that they tend to apply an uncomfortable pressure on drivers or seated occupants, particularly those who are relatively short in stature. The belt tends to dig into sensitive areas of the user.

One of the solutions for obviating this problem is to provide a pad that is mounted on the seat belt and which can be slid to a position where it provides comfort to the user. Usually such pads are relatively difficult to mount on the shoulder belt, are expensive and sometimes are also uncomfortable.

SUMMARY OF THE INVENTION

The broad purpose of the present invention is to provide an improved cushion for a shoulder belt which comprises a resilient foam pad enclosed in a fabric cover. Hook and loop fastener means along opposite side edges of the cover are adapted to connect the side edges of the cover over the shoulder belt. The cover is folded along a longitudinal fold line. Stitching is applied to the ends of the fold line to connect the cover to the foam pad. This provides the advantage of making it easy for the user to fold the cover over the belt, but also provides the advantage of having an unstitched midsection for comfortably engaging the user.

The hook and loop fastener tapes are stitched along the opposite side edges of the cover, but the ends of each tape are spaced about 1 inch from the ends of the cover edges so that the user can easily grasp the cover edges to separate it from the shoulder belt. It is of particular use for older people who sometime have difficulty in grasping fabric objects.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which.

SUMMARY OF THE PRESENT INVENTION

Figure 1:
FIG. 1 is a view illustrating a cushion mounted on a shoulder belt in accordance with the present invention.

Referring to the drawing, vehicle 10, illustrated in FIG. 1, shows a user 12 in the passenger compartment of the vehicle. A conventional shoulder belt 14 has its upper end attached to anchor means 16 and its lower end extending down toward the user's waist, in the manner well known to those skilled in the art.

Figure 2:
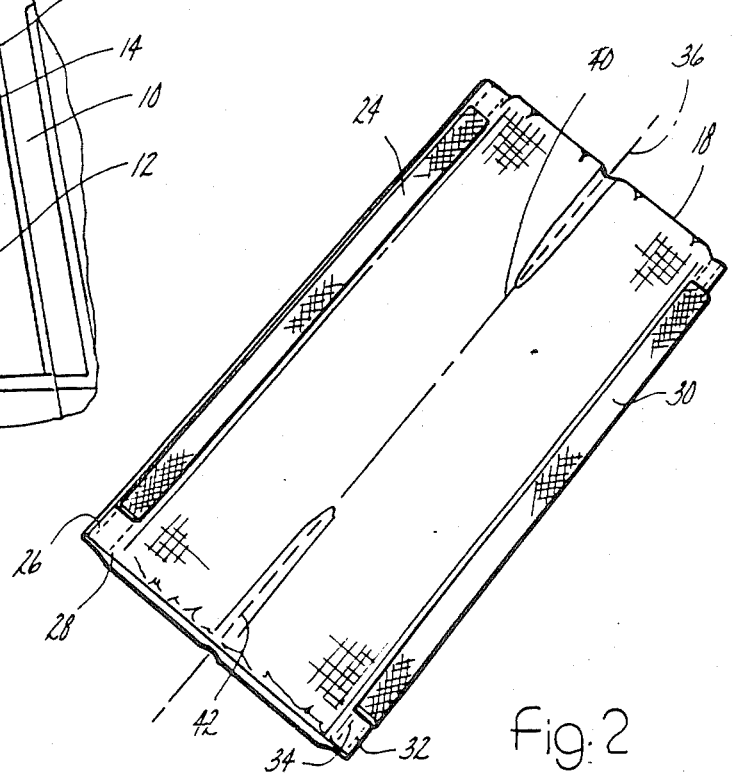
FIG. 2 is a view of the preferred cushion in an unfolded condition.
Figure 3:
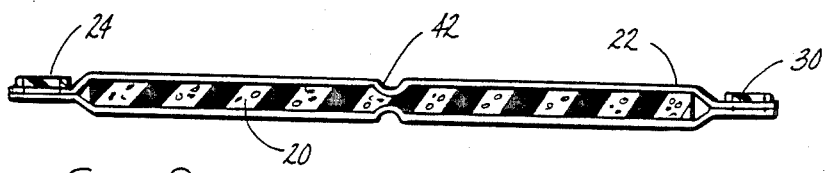
FIG. 3 is a sectional view through the cushion of FIG. 2.
Figure 4:
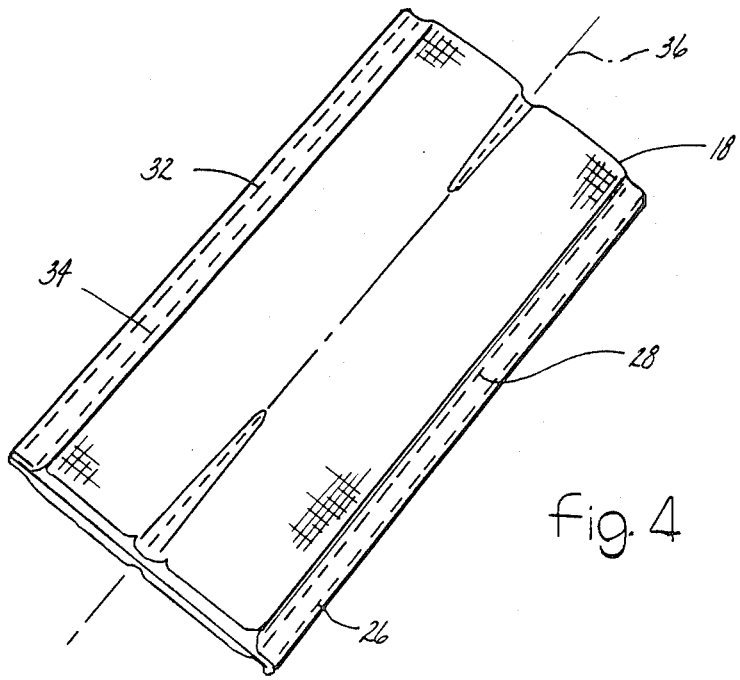
FIG. 4 is a view of the opposite side of the cushion illustrated in FIG. 2.

Cushion 18 is slidably mounted on belt 14. Cushion 18 includes a foam pad 20 and a fabric cover 22. Pad 20 is a resilient cellular product that is relatively soft, about ½ inch thick, 14 inches in length and about 4½ inches in width. Cover 22 is a suitable fabric material folded and stitched along its side edges to totally enclose pad 20. As best shown in FIG. 2, a fabric loop tape 24 having a plurality of loops similar to that sold under the Velcro trademark, is attached by stitching 26 and 28 along the side edge of the cover. The ends of the tape are spaced about 1 inch from the ends of the cover side edges.

Similarly, a complementary fastener tape 30, preferably formed of fabric loops, also sold under the Velcro trademark, is attached by stitched 32 and 34 to the opposite side edge of the cover. The ends of tape 30 are also spaced about 1 inch from the ends of the side edge of the cover to which tape 30 is attached. Tape 30 is thus releaseably fastenable along its full length to tape 24. The untaped ends of the cover edges permit a user to easily grasp the corners of the cover and then to progressively unfasten one of the tapes from the other to remove the cushion from the belt.

The cover is folded about an imaginary fold line 36, which is parallel to fasteners 24 and 30. Stitching 40 and 42 at opposite ends of the fold line connect the cover to the opposite ends of the pad. Preferably, stitching 40 and 42 are each about 2½ to 3 inches in length so that the midsection of the pad is unstitched. Stitching 40 and 42 provide means for anchoring the pad within the cover so that it does not shift its position, as well as defining the ends of the fold line to assist the user in easily folding the cushion in half.

I have described a novel form of a shoulder belt cushion, which the user can easily fold about a shoulder belt, then slide the cushion to a position along the belt in which the unstitched fold of the cushion will not irritate the user. The corners of the cushion can be easily grasped by the user to separate the two halves of the cushion when it is to be removed from the belt.

The cushion fabric can be made in a variety of materials and colors to accommodate the vehicle's interior.

Having described my invention, I claim:

1. A cushion for a shoulder belt, comprising:

and elongated resilient pad;

a flexible cover enclosing the pad so that a portion of said cover extends laterally outwardly from each side of said pad, the cover having a pair of spaced parallel side edges;

the pad and the cover having a longitudinal fold line disposed parallel to the side edges and between the side edges, said fold line being equidistantly spaced from said side edges, the fold line having a first end adjacent one end of the pad, and a second end adjacent the opposite end of the pad;

releasable fastener means connected to the outwardly extending portion along the pair of spaced side edges;

first stitching along one end of the fold line having a length substantially less than the length of the fold line;

second stitching along the second end of the fold line having a length such that the midsection of the fold line, between the first stitching and the second stitching, is unstitched;

whereby the pad and the cover may be folded along the fold line and the opposite side edges releasably fastened together about a shoulder belt so as to be slidable along the shoulder belt to a position in which the unstitched midsection of the fold line is disposed adjacent a user in a selected position along the shoulder belt.

2. A cushion as defined in claim 1, in which the cover is formed of a fabric material.

3. A cushion as defined in claim 1, in which the pad is formed of a resilient foam material.

* * * * *